Aug. 8, 1944.     E. B. GRAVES     2,355,068
METERING DEVICE FOR X-RAY APPARATUS
Filed March 27, 1942

INVENTOR
EDWARD B. GRAVES
BY
*Hyde and Meyer*
ATTORNEYS

Patented Aug. 8, 1944

2,355,068

UNITED STATES PATENT OFFICE 2,355,068

METERING DEVICE FOR X-RAY APPARATUS

Edward B. Graves, South Euclid, Ohio, assignor to Picker X-Ray Corporation, Waite Manufacturing Division, Inc., Cleveland, Ohio, a corporation of Ohio Application March 27, 1942, Serial No. 436,472

2 Claims. (Cl. 250—93)

This invention relates to improvements in a metering device for X-ray apparatus.

One object of the invention is to provide improved means for more accurately indicating the kilovoltage impressed upon the tube circuit.

Another object is to provide such accurate indication by simple means readily applicable to ordinary tube circuits and involving no change in the usual voltmeter beyond the provision of a special scale on which the division margins are separated more than is usual and consequently admit of closer interpolation.

Further objects of the invention in part are obvious and in part will appear more in detail hereinafter.

Figure 1:
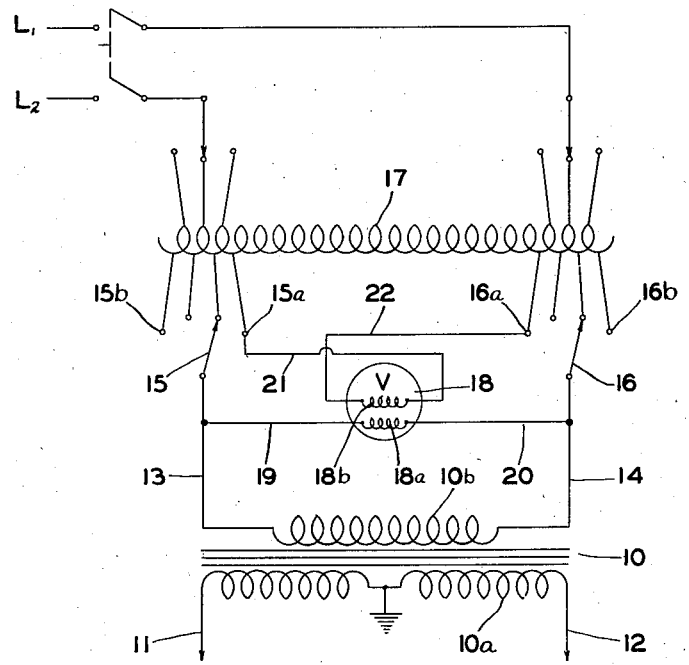
Figure 2:
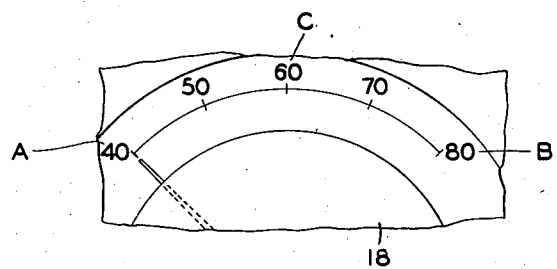

In the drawing, Fig. 1 is a diagrammatic view of my improved metering circuit; while Fig. 2 represents a portion of the dial of the voltmeter shown in Fig. 1.

In Fig. 1 I have shown a high tension transformer 10 having a secondary winding 10a which is connected by conductors 11 and 12 to the usual X-ray tube operating circuit (not shown). The primary winding 10b is connected by conductors 13 and 14 and by the voltage selectors 15 and 16 with an autotransformer 17, which in turn is supplied from source $L_1$, $L_2$. In the form illustrated, it has been assumed that the source supplies 120 volt current and that the selectors 15 and 16 when contacting the secondary taps 15a and 16a impress approximately 60 volts on the primary winding 10b, which corresponds to the production of about 40 kilovolts in the secondary winding 10a. It is also assumed that when the selectors contact the taps 15b and 16b the primary voltage is 120, corresponding to the production of 80 kilovolts in winding 10a.

Heretofore it has been customary to connect a voltmeter 18 across the primary transformer windings, as by the conductors 19 and 20, to indicate the voltage there impressed, and the scale on the voltmeter 18 has been graduated in terms of kilovolts. In such an arrangement, with the assumed values, the scale of Fig. 2 normally would read zero at its left end, as at A, and 60 kilovolts at its right end, as at B. Inasmuch as the useful working range of a tube usually is about half this amount, to-wit, from 40 to 80 kilovolts, then according to such prior practice when the selectors 15 and 16 engage the taps 15a and 16a the needle of the voltmeter lies approximately at the center of the scale, as at C, and the scale would there indicate 40 kilovolts. Thus the scale readings from 40 to 80 kilovolts normally would occupy the upper half only of the length of scale shown in Fig. 2, and the lower half of the scale is useless.

One object of the present invention, therefore, is to utilize the entire length of the scale shown in Fig. 2 to indicate the same useful operating range of the X-ray tube, with consequent spread and greater accuracy of the scale markings.

To this end I impress upon the voltmeter, in addition to the normal voltage usually impressed thereon, a bucking voltage approximately equal to the minimum primary voltage capable of being connected for use at the minimum taps 15a and 16a. This may be accomplished with a separate transformer winding, but a very simple arrangement is to cross connect by conductors 21 and 22 the voltage taps 15a and 16a to a second coil 18b in the voltmeter 18 so as to oppose the effect of the normally connected coil 18a. Thus when the selectors 15 and 16 are set at taps 15a, 16a to supply the minimum operating voltage, an equal and opposite voltage is impressed on the voltmeter and the pointer is at position A, ordinarily marked zero but here calibrated to read 40 kilovolts, which is the actual working voltage impressed upon the tube at this minimum setting. Also, the voltmeter actually employed is selected with such constants, such as the exciting coil or series resistance, that a given variation in voltage effective upon the meter produces just twice as much pointer movement as is usual. Accordingly, when the selectors are now set at the taps 15b, 16b, to supply the maximum voltage of 120 volts, the pointer moves over the full length of the scale to position B. At each of the two positions, minimum and maximum, and proportionately at all intermediate positions, the voltmeter is sensitive to, and its pointer lies in a position corresponding to the difference between the voltage impressed on the transformer primary 10b and the bucking voltage connected across the voltmeter by the leads 21 and 22, and the scale is calibrated so that it always indicates the working kilovoltage actually being applied to the tube. But, as stated, with the assumed values this brings 40 kilovolts on the scale at A and the indication of 80 kilovolts at B. Thus the full length of the scale is required and is used for the entire practical operating range of the X-ray tube. The scale indicia consequently are more widely separated and the scale is more accurate and is easier to read, and it always directly indicates the working voltage.

What I claim is:

1. In an electrical circuit for operating X-ray tubes employing a high tension transformer for supplying tube voltage and wherein the energizing circuit for the primary of said transformer is provided with a series of predetermined fixed settings for selecting various tube voltages, including settings for the minimum and maximum primary votages corresponding to the lowest and highest kilovoltages impressed upon the tube when in use, the combination of a voltmeter connected across said transformer primary energizing circuit and sensitive to the voltage impressed upon said primary, means for applying directly from its source to said voltmeter a constant bucking voltage substantially equal to said minimum primary voltage and independent of said transformer primary voltage, means energizing said last named means simultaneously with the energizing of the primary of said transformer, said voltmeter having electrical constants providing movement of its pointer over the full scale length for variation in voltage over the full range between said maximum primary voltage and said maximum primary voltage decreased by said constant bucking voltage and having scale indications varying from the maximum to the minimum kilovolts actually applicable to the tube by various selections of said settings, whereby said voltmeter responds to the difference between the energizing primary voltage and said bucking voltage but indicates the actual operating kilovoltage effective upon the tube, with the spacings between scale indicia thereby extended.

2. In an electrical circuit for operating X-ray tubes employing a high tension transformer for supplying tube voltage and wherein the energizing circuit for the primary of said transformer is provided with a series of predetermined fixed settings for selecting various tube voltages, including settings for the minimum and maximum primary voltages corresponding to the lowest and highest kilovoltages impressed upon the tube when in use, the combination of a voltmeter connected across said transformer primary energizing circuit and sensitive to the voltage impressed upon said primary, means including leads from the voltmeter cross connected to the settings for the minimum primary voltage for applying to said voltmeter a constant bucking voltage substantially equal to said minimum primary voltage and independent of said transformer primary voltage, said voltmeter having electrical constants providing movement of its pointer over the full scale length for variation in voltage over the full range between said maximum primary voltage and said maximum primary voltage decreased by said constant bucking voltage and having scale indications varying from the maximum to the minimum kilovolts actually applicable to the tube by various selections of said settings, whereby said voltmeter responds to the difference between the energizing primary voltage and said bucking voltage but indicates the actual operating kilovoltage effective upon the tube, with the spacings between scale indicia thereby extended.

EDWARD B. GRAVES.

CERTIFICATE OF CORRECTION.

Patent No. 2,355,068. August 8, 1944.

EDWARD B. GRAVES.

It is hereby certified that error appears in the printed specification of the above numbered patent requiring correction as follows: Page 1, first column, line 45, for "and 60" read --and 80--; and that the said Letters Patent should be read with this correction therein that the same may conform to the record of the case in the Patent Office.

Signed and sealed this 14th day of November, A. D. 1944.

(Seal)

Leslie Frazer
Acting Commissioner of Patents.